Nov. 1, 1949     J. C. ROUSE     2,486,983
CLOTHESLINE TENSION CONTROL
Filed Oct. 6, 1947
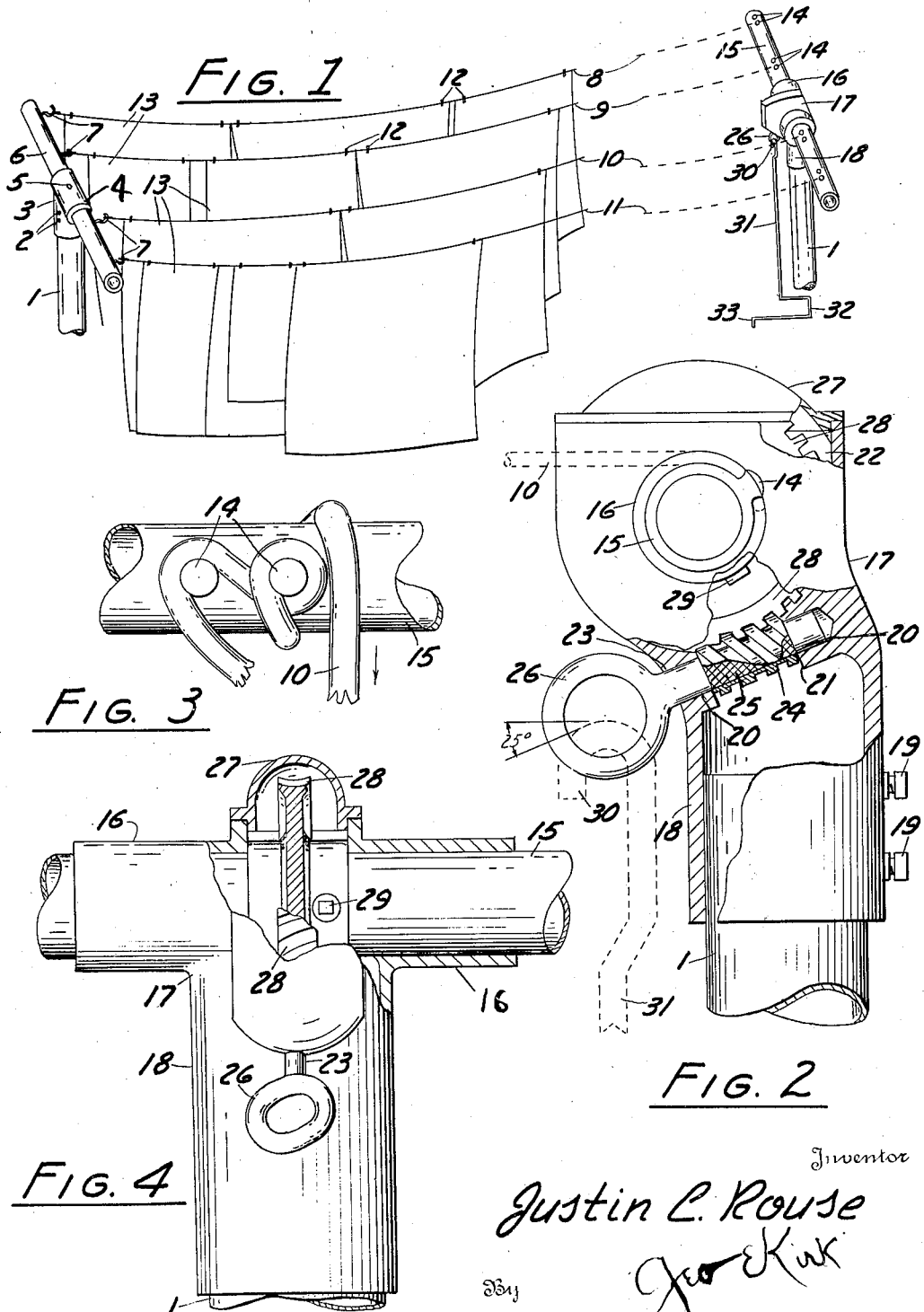

UNITED STATES PATENT OFFICE 2,486,983

CLOTHESLINE TENSION CONTROL

Justin C. Rouse, Port Huron, Mich.

Application October 6, 1947, Serial No. 778,228

2 Claims. (Cl. 211—119.15)

This invention relates to taut control of a plurality of lines, more particularly as adjustable from one supporting region therefor.

This invention has utility when incorporated on clothes line supports, especially for a plurality of reaches of line to a column or post having a cross-arm. By rotatably mounting the cross arm and providing an actuator therefor, even several loaded clothes lines may be tightened simultaneously and the cross arm held against reverse rotation.

Referring to the drawings:

Fig. 1 is a perspective view, with parts broken away, of an embodiment of the invention in a plural clothes line taut adjusting means;

Fig. 2 is an enlarged detail view, with parts in section, of a clothes line column or post cap as a carrier for a relatively and controllably rotatable cross-arm;

Fig. 3 is a fragmentary detail of line connection to the cross-arm; and

Fig. 4 is a partial side elevation, from the left of Fig. 2, showing features of the post cap.

Firmly anchored in the ground, an upright post 1, say of iron pipe, is shown as having engagement by set screws 2 in mounting thereon a cap 3. The cap 3 has a T- or cross passage 4 where a set screw 5 anchors a cross-arm or pipe 6 having therealong a plurality of hooks 7 adapted to engage clothes lines 8, 9, 10, 11 having clothes pins or engaging means 12 for holding various items 13 of a washing or laundry for drying or airing.

The approximately parallel reaches of the several lines 8, 9, 10, 11, may be secured to snubbing pin pairs 14 of a pipe cross arm 15. The arm 15 is rotatably carried in a T-way or cross bearing 16 of a cap 17 having a downwardly extending sleeve portion 18 anchored by set screws 19 with a second post 1.

In the cap 17 above the sleeve portion 18 there is a passage 20 upwardly inclined about 25° and having a central clearance region 21 in communication with upwardly open chamber 22 in the cap 17. A pin 23, say 5/8" in diameter is thrust into this .63" diameter passage 20 after a worm element 24 is in alignment therewith at the region 21. This movement of the pin 23 is a drive fit to bring medially roughened or knurled portion 25 of the pin 23 into keyed cooperation with the worm type of toothed gear 24. A ring or eye end 26 for the pin 23 extends outward clear of the cap 17.

A slip cover or lid 27 may be removed from the open top chamber 22 and a worm gear 28 placed therein to mesh with the worm 24. At this position for the gear 28, the pipe cross arm 15 may be pushed thru the bearing 16 and the hub of the gear 28. The gear hub in in the chamber 22 as clearance between the sections of the bearings 16. With the arm 15 entered to extend outward approximately an equal distance each way from the cap 17, a set screw 29 may anchor the worm gear 28 with the arm 15. The transmission assembly of the gearing is thus completed and the lid 27 may be replaced, say after a grease or hard oil be introduced therein.

A long hook 30 is detachable as to the ring 26 and is offset to align with a stem 31 having crank portions 32, 33. Rotation of the crank is a key connection as a universal joint 30, 26, for turning the worm 24. In the preferred practice hereunder, the angle of friction of the gearing is sufficient to hold the cross-arm 15, regardless of the load thereon. Acceptable performance is had with a double thread Boston worm of approximately 1/2" root radius and a Boston gear of 2" root radius. The 25° angle for the axis of the worm 24 establishes a sufficient downward pitch for the pin 23 that the crank 32, 33, operates conveniently. In the instance of 2 1/2" pipe for the post 1 and 1 1/4" galvanized pipe for the cross arm 15, the axis of the arm 15 approximates the plane of the tangent to the post 1. There is sufficient rigidity so that the overhang does not weaken the crossarm, say with 58" length for the arm 15 and regardless of the span between the posts 1 as well as length or number of reaches.

What is claimed and it is desired to secure by Letters Patent is:

1. A multiple clothes line tension control for a plurality of lines embodying a cross-arm, spaced pairs of pins on the cross-arm for connecting the lines thereon, a cap for a clothes line post having a sleeve secured by a set screw to the post, a housing offset upwardly from the sleeve and providing bearings extending transversely from the housing and having the cross-arm extending through the bearings, speed reduction gearing including a first gear in the housing through which the cross-arm extends and to which the cross arm is secured, a housing lid mounted on the top of the housing and shielding the gear, a drive pin rotatably mounted in the housing and having an additional gear thereon and in mesh with said first gear, and a crank having means for detachable connection with the drive pin, effective through the gearing to rotate the cross-arm in the bearings.

2. A multiple clothes line tension control for a plurality of lines, embodying a cross-arm, spaced pairs of pins on the cross-arm for connecting the lines thereon, a cap for a clothes line post having a sleeve secured by a set screw to the post, a housing offset upwardly from the sleeve and providing bearings extending transversely from the housing and having the cross-arm extending thru the bearings, a worm gear in the housing thru which the cross-arm extends and to which the cross-arm is secured, a housing lid mounted on the top of the housing and shielding the gear, a drive pin rotatably mounted in the housing and having a worm fixed thereon and in mesh with the worm gear, and a crank having means for detachable connection with the drive pin, effective thru the worm and gear to rotate the cross-arm in the bearings.

JUSTIN C. ROUSE.

REFERENCES CITED

The following references are of record in the file of this patent:

UNITED STATES PATENTS

| Number | Name | Date |
|---|---|---|
| 216,298 | Weston | June 10, 1879 |
| 985,485 | Willard | Feb. 28, 1911 |
| 1,140,787 | Baeumle | May 25, 1915 |
| 1,158,172 | Bunnell | Oct. 26, 1915 |
| 1,352,983 | Manly | Sept. 14, 1920 |
| 1,820,314 | Mendelson | Aug. 25, 1931 |
| 2,166,771 | Robertson | July 18, 1939 |
| 2,202,193 | Davis | May 28, 1940 |